United States Patent
Szmanda et al.

(10) Patent No.: US 6,907,432 B1
(45) Date of Patent: Jun. 14, 2005

(54) METHOD AND SYSTEM FOR RECYCLING MATERIALS

(75) Inventors: Charles R. Szmanda, Westborough, MA (US); Peter Trefonas, III, Medway, MA (US); Richard C. Hemond, Acton, MA (US); Mark S. Thirsk, Mendon, MA (US); Leo L. Linehan, Grafton, MA (US); Anthony Zampini, Westborough, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 604 days.

(21) Appl. No.: 09/723,746

(22) Filed: Nov. 28, 2000

(51) Int. Cl.[7] .............................................. G06F 17/30
(52) U.S. Cl. ........................... 707/104.1; 707/10; 705/1
(58) Field of Search ............................. 707/1, 3, 5, 10, 707/104.1, 100, 102; 705/1, 28, 8, 9, 29

(56) References Cited

U.S. PATENT DOCUMENTS 5,084,483 A    1/1992  Yamashita et al. ............. 521/40
5,970,476 A  * 10/1999 Fahey ............................ 705/28
6,205,060 B1 *  3/2001 Sanda et al. ............. 365/189.04
6,226,617 B1 *  5/2001 Suzuki et al. ................... 705/1
6,341,287 B1 *  1/2002 Sziklai et al. ................ 707/102

* cited by examiner

Primary Examiner—Charles L. Rones
Assistant Examiner—Hassan Mahmoudi
(74) Attorney, Agent, or Firm—Marisa J. Dubuc; S. Matthew Cairns

(57) ABSTRACT

A system and method is provided for recycling raw materials from a plurality waste streams generated by waste stream providers and includes a waste stream monitoring module for monitoring the plurality of waste streams and determining an amount of reusable raw materials contained in each of the plurality of waste streams. Also included is a reusable materials database for storing the amount of each of the raw materials contained in any of the plurality of waste streams. A user operating an access device communications with the reusable materials database for viewing the amount of each of said raw materials.

14 Claims, 1 Drawing Sheet

METHOD AND SYSTEM FOR RECYCLING MATERIALS

BACKGROUND

The following invention relates to a system and method for recycling and, in particular, a system and method for recycling materials used in a manufacturing process.

Generally, raw materials costs comprise a substantial portion of the cost of manufacturing a particular product. For example, a substantial cost in the production of semiconductors is the cost of the chemicals used during the manufacturing process. Certain chemicals, such as photoresist, comprise a large percentage of this chemical cost and any significant change in the cost of these chemicals will have an impact on the overall cost of the manufactured product.

Many of the chemicals used for semiconductor production are not completely exhausted during the manufacturing process. In fact, the waste stream generated during manufacturing includes a sizeable portion of chemicals such as photoresist and developer. Prior art techniques exist for processing such waste streams to retrieve reusable chemicals contained therein. For example, U.S. Pat. No. 5,084,483 issued to Yamashita is directed to a method for recovering and reusing resist composition scatters in silicon wafer coating. The recovery of the chemicals from the waste stream and their reuse would have a material impact on manufacturing costs.

Although techniques exist for recovering and reusing chemicals from the waste streams of semiconductor manufacturing, these techniques are rarely used and thus have minimal impact on the cost of chemicals used in the manufacturing process. The semiconductor manufacturers themselves have little incentive to reprocess their waste streams because they lack the expertise to do so and such efforts would be a distraction to their main business. Furthermore, the cost to implement a recovery/reuse facility may not be economically feasible if such a facility is to be used to reprocess just the manufacturers own waste streams. The chemical manufacturers also have little interest in promoting chemical recycling as this would reduce their profit margin on new chemicals. Thus, the chemicals contained in waste streams are not recovered and, as a result, the potential costs saving from their reuse is lost.

Accordingly, it is desirable to provide a system and method for recycling materials contained in waste streams generated as a by-product to a manufacturing process.

SUMMARY OF THE INVENTION

The present invention is directed to overcoming the drawbacks of the prior art. Under the present invention a system and method is provided for recycling raw materials from a plurality waste streams generated by waste stream providers and includes a waste stream monitoring module for monitoring the plurality of waste streams and determining an amount of reusable raw materials contained in each of the plurality of waste streams. Also included is a reusable materials database for storing the amount of each of the raw materials contained in any of the plurality of waste streams. A user operating an access device communicates with the reusable materials database for viewing the amount of each of the raw materials.

In an exemplary embodiment the reusable materials database includes a price for each of said raw materials.

In another exemplary embodiment, the user issues a purchase request for a specified amount of at least one of the raw materials according to the price indicated in the reusable materials database.

In yet another exemplary embodiment, a waste purchasing module is included for receiving the purchase request and issuing a purchase order to at least one of the waste stream providers for fulfilling the purchase request. Upon receiving the purchase order the at least one of the waste stream providers delivers at least one of said plurality of waste streams to a recovery plant wherein the recovery plant recovers the specified amount of at least one of the raw materials. Finally, the specified amount of at least one of the raw materials is transported to a location indicated by the user.

Accordingly, a system and method is provided for recycling materials contained in a plurality of waste streams generated by manufacturing processes.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

BRIEF DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
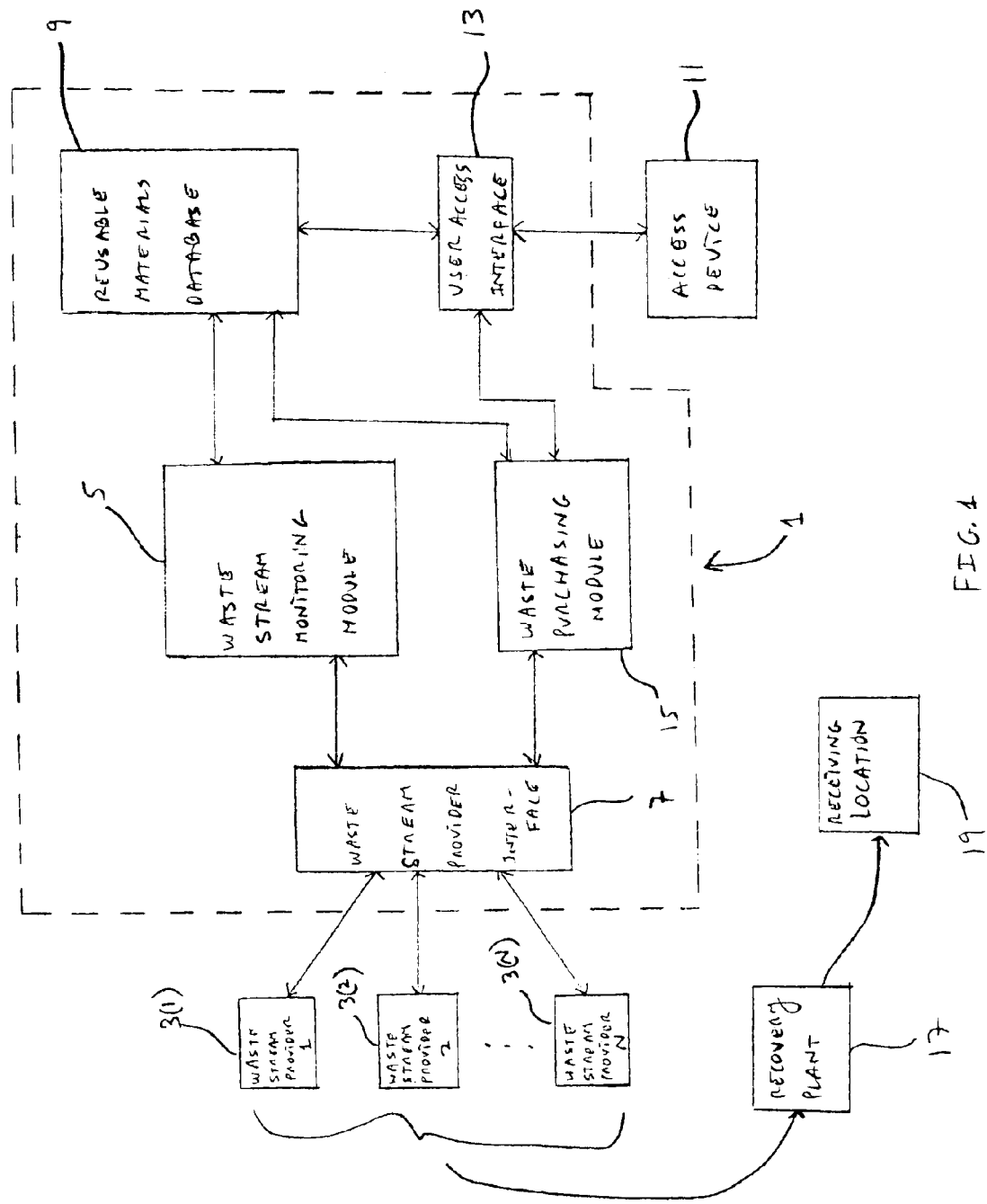
FIG. 1 is a block diagram of the recycling system of the present invention.

Referring now to FIG. 1, there is shown a recycling system 1 for recycling waste from a plurality of waste stream providers 3, in accordance with the present invention. Recycling system 1 includes a waste stream monitoring module 5 that communicates with waste stream providers 3 via a waste stream provider interface 7 for the purpose of monitoring the waste generated by each of waste stream providers 3 and determining the reusable materials contained therein. Waste stream providers 3 may communicate with waste stream provider interface 7 using any known methods, mediums or protocols including, by way of non-limiting example, the Internet. Waste stream monitoring module 5 may determine the reusable contents of the waste stream using any number of known methods for monitoring and analyzing the contents of waste. For example, if one of waste stream providers 3 uses, for instance, resist coating and development equipment to produce wafers, waste stream monitoring module 5 would then monitor the number of wafers produced by the equipment and calculate, based on predetermined relationships, the amount of raw materials, such as photoresist and developer, that is expelled by the wafer stepper for the given number of wafers produced. Alternatively, a sensor may be located in the waste stream produced by the wafer stepper for monitoring the volume and contents of the waste stream. The sensor then relays this information to waste stream monitoring module 5 which then calculates the amount of reusable raw materials contained in the waste stream. Examples of sensors that may be used to monitor the contents of a waste stream using well known techniques include capacitive level sensors, mechanical level sensors, scales and load cells. Similarly, any other method for monitoring any type of waste stream and analyzing its contents may be used with the results of such analysis being provided to waste stream monitoring module 5.

Waste stream monitoring module 5 then communicates to reusable materials database 9 the amount of reusable materials contained in the waste streams generated by each of waste stream providers 3. A price is determined for each of the recycled materials stored in reusable materials database 9 based on all relevant factors including, but not limited to, the price of the corresponding new materials, the available supply and quality of the recycled material. Thus, reusable materials database 3 contains a searchable catalog of all the reusable materials contained in the waste streams generated by waste stream providers 3.

A user operating a user access device 11, for example a personal computer, may query reusable materials database 9, via user access interface 13, to determine whether a desired material, for example photoresist, is available in recycled form from any of waste stream providers 3 and, if so, in what quantity and at what price. If the user locates in reusable materials database 9 the desired recycled material at an acceptable price, the user issues a purchase request to user access interface 13 for a specified amount of the desired material. User access interface 13 forwards the purchase request to a waste purchasing module 15. Based on the material and quantity specified in the purchase order, waste purchasing module 15 accesses reusable materials database 9 to determine which of waste stream providers 3 is the most suitable source for the specified recycled material. Upon selecting one of waste stream providers 3, waste purchasing module 15 issues a purchase order, via waste stream provider interface 7, to the one of waste stream providers 3 for the waste stream from which the specified materials are to be recovered.

Upon receiving the purchase order, the one of waste stream providers 3 ships the specified waste stream to a recovery plant 17. The waste stream is shipped using known techniques that prevent environmental contamination and/or decomposition of the desired materials. After shipping the waste stream to recovery plant 17, the one of waste stream provider 3 notifies waste purchasing module 15 that the waste stream containing the desired materials was shipped and waste purchasing module 15 then updates reusable materials database 9 to reflect the change in availability of the particular material.

Recovery plant 17 reprocesses the waste stream and recovers from the waste stream the materials specified by the user in the purchase request. The recovery process uses known industrial methods designed to restore the materials recovered from the waste stream. In one embodiment, the materials are restored to their original specifications that may include, by way of non-limiting example, the materials' sensitivity, viscosity, thickness, metal ion concentration and film thickness. Alternatively, the materials may be restored to revised specifications that render the material suitable for use in certain applications. The determination of whether to restore the materials to the original or revised specification may be made based on the requirements of the user as specified in the purchase request. In another embodiment, recovery plant 17 separates the waste stream into its constituents, purifies them, re-blends them and adds some new raw materials, as required, to produce recycled materials conforming either to their original or revised specifications.

In yet another embodiment, recovery plant 17 separates the waste stream into common chemical components and combines the chemical components to form a new raw material other than the original raw materials from which the particular waste stream was generated. Forming the new raw material from the waste stream may be desirable in cases where the original raw materials are complex and difficult to recover from the waste stream.

In an exemplary embodiment, waste stream providers 3 monitor the batch composition of the original raw materials that generated each particular waste stream. The batch composition information indicates various characteristics of the original raw materials including, by way of non-limiting example, the quality of such raw materials. Waste stream providers 3 provide to system 1 via waste stream provider interface 7 the batch composition information which is used by waste stream monitoring module 5 to determine the particular raw materials that can be recovered from a particular waste stream the most efficiently. For example, if the batch composition information associated with a particular waste stream indicates that the original raw materials that generated the waste stream were of a poor quality, waste stream monitoring module 5 may then determine that a new and less complex raw material could be more efficiently recovered from the particular waste stream. Waste stream monitoring module 5 then communicates the type and quantity of recoverable raw materials to reusable materials database 9, as described above.

Finally, the recycled materials are then shipped from recovery plant 17 to a location 19 designated by the user thereby fulfilling the user's purchase request. In one embodiment, the user is the one of waste stream providers 3 that generated the waste stream from which the recycled materials were recovered.

Accordingly, a system and method is provided for recycling materials contained in a plurality of waste streams generated by manufacturing processes. The system of the present invention analyzes the contents of the waste streams to determine what reusable materials are contained therein and maintains a listing of such reusable materials. A user may access the system to locate desirable recycled materials that are recoverable from various waste streams and to purchase the desired materials. Thus, by recovering and re-distributing materials from waste streams, the system of the present invention helps reduce the overall cost of raw materials used in a particular manufacturing process.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method for recycling raw materials from a plurality of streams generated by waste stream providers, comprising:

monitoring production of items produced by a plurality of waste streams providers and determining an amount of reusable raw materials contained in a plurality of waste streams resulting from said production via a waste stream monitoring module;

communicating production information from said plurality of waste stream providers to said waste stream monitoring module via a waste stream provider interface and communications link;

storing said amount of reusable raw materials contained in said plurality of waste streams in a reusable materials database, said reusable materials database in communication with said waste stream monitoring module;

wherein said reusable raw materials are available for purchase;

associating a purchase price with each of said reusable raw materials, said purchase price stored in said reusable materials database; and viewing said reusable raw materials via a user access interface and communications link, said user access interface in communication with said reusable materials database.

2. The method of claim 1, further comprising:

receiving a purchase request from said user via said user access interface and communications link, said purchase request received at a waste purchasing module;

wherein said user access interface is in communication with said waste purchasing module;

selecting a suitable waste stream provider based upon said purchase request; and issuing a purchase order to said suitable waste stream provider for fulfilling said purchase request.

3. The method of claim 2, further comprising:

receiving at least one of said plurality of waste streams from said suitable waste stream provider at a recovery plant, said recovery plant in communication with said suitable waste stream provider; and recovering a specified amount of said reusable raw materials by said recovery plant.

4. The method of claim 3, further comprising:

transporting said specified amount of said reusable raw materials to a location indicated by said user.

5. The method of claim 4, further comprising:

updating amounts of available reusable raw materials in said reusable materials database based on receipt of said reusable raw materials transported to said location, said updating performed by said waste purchasing module.

6. The method of claim 3, wherein one of said plurality of waste streams is generated from at least one original raw material and said reusable raw materials resulting from said recovery are different than said original raw material.

7. The method of claim 1, wherein said waste stream monitoring module receives batch composition information associated with said plurality of waste streams via said waste stream provider interface and communications link and said waste stream monitoring module determines said amount of reusable raw material based on said batch composition information.

8. A system for recycling raw materials from a plurality of streams generated by waste stream providers, comprising:

a waste stream monitoring module operable for:

monitoring production of items produced by a plurality of waste stream providers; and determining an amount of reusable raw materials contained in a plurality of waste streams resulting from said production;

a waste stream provider interface and communications link operable for communicating production information from said plurality of waste stream providers to said waste stream monitoring module;

a reusable materials database in communication with said waste stream monitoring module, said reusable materials database operable for storing said amount of reusable raw materials contained in said plurality of waste streams;

wherein said reusable raw materials are available for purchase;

a purchase price associated with each of said reusable raw materials, said purchase price stored in said reusable materials database; and a user access interface and communications link operable for enabling a user to view said reusable raw materials, said user access interface in communication with said reusable materials database.

9. The system of claim 8, further comprising a waste purchasing module operable for:

receiving a purchase request from said user via said user access interface and communications link, said user access interface in communication with said waste purchasing module;

selecting a suitable waste stream provider based upon said purchase request; and issuing a purchase order to said suitable waste stream provider for fulfilling said purchase request.

10. The system of claim 9, further comprising a recovery plant in communication with said suitable waste stream provider, said recovery plant receiving at least one of said plurality of waste streams from said suitable waste stream provider;

wherein said recovery plant recovers a specified amount of said reusable raw materials.

11. The system of claim 10, wherein said specified amount of said reusable raw materials is transported to a location indicated by said user.

12. The system of claim 11, wherein said waste purchasing module updates amounts of available reusable raw materials in said reusable materials database based on receipt of said reusable raw materials transported to said location.

13. The system of claim 10, wherein one of said plurality of waste streams is generated from at least one original raw material and said reusable raw materials resulting from said recovery are different than said original raw material.

14. The system of claim 8, wherein said waste stream monitoring module receives batch composition information associated with said plurality of waste streams via said waste stream provider interface and communications link and said waste stream monitoring module determines said amount of reusable raw material based on said batch composition information.

* * * * *